Figure 1:
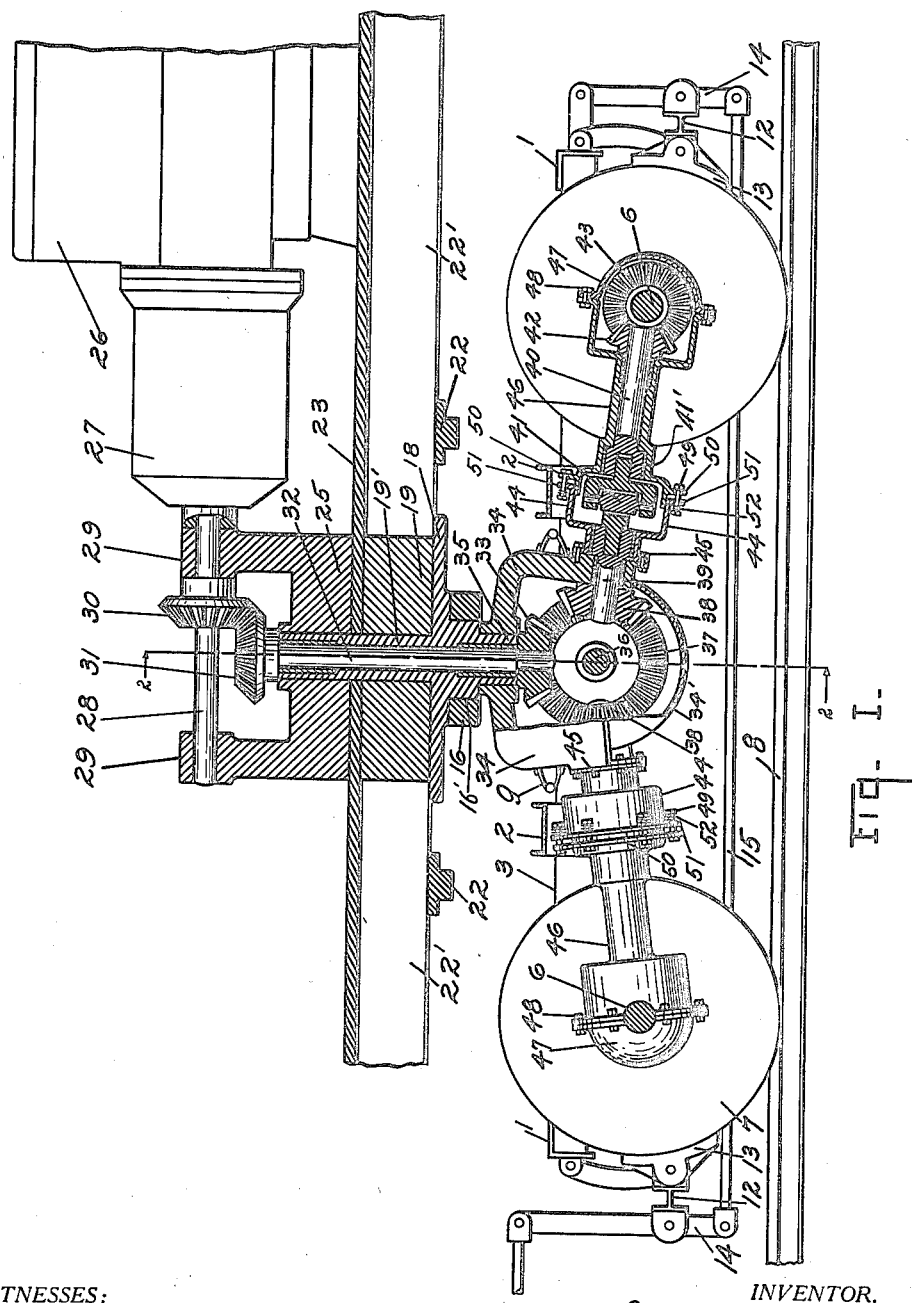

S. J. DUNKLEY.
DRIVING MEANS FOR MOTOR DRIVEN RAILWAY CARS.
APPLICATION FILED MAR. 1, 1916.

1,222,610.

Patented Apr. 17, 1917.
2 SHEETS—SHEET 1.

WITNESSES:
Luther Blake
[signature]

INVENTOR.
Samuel J. Dunkley
BY [signature]
ATTORNEYS.

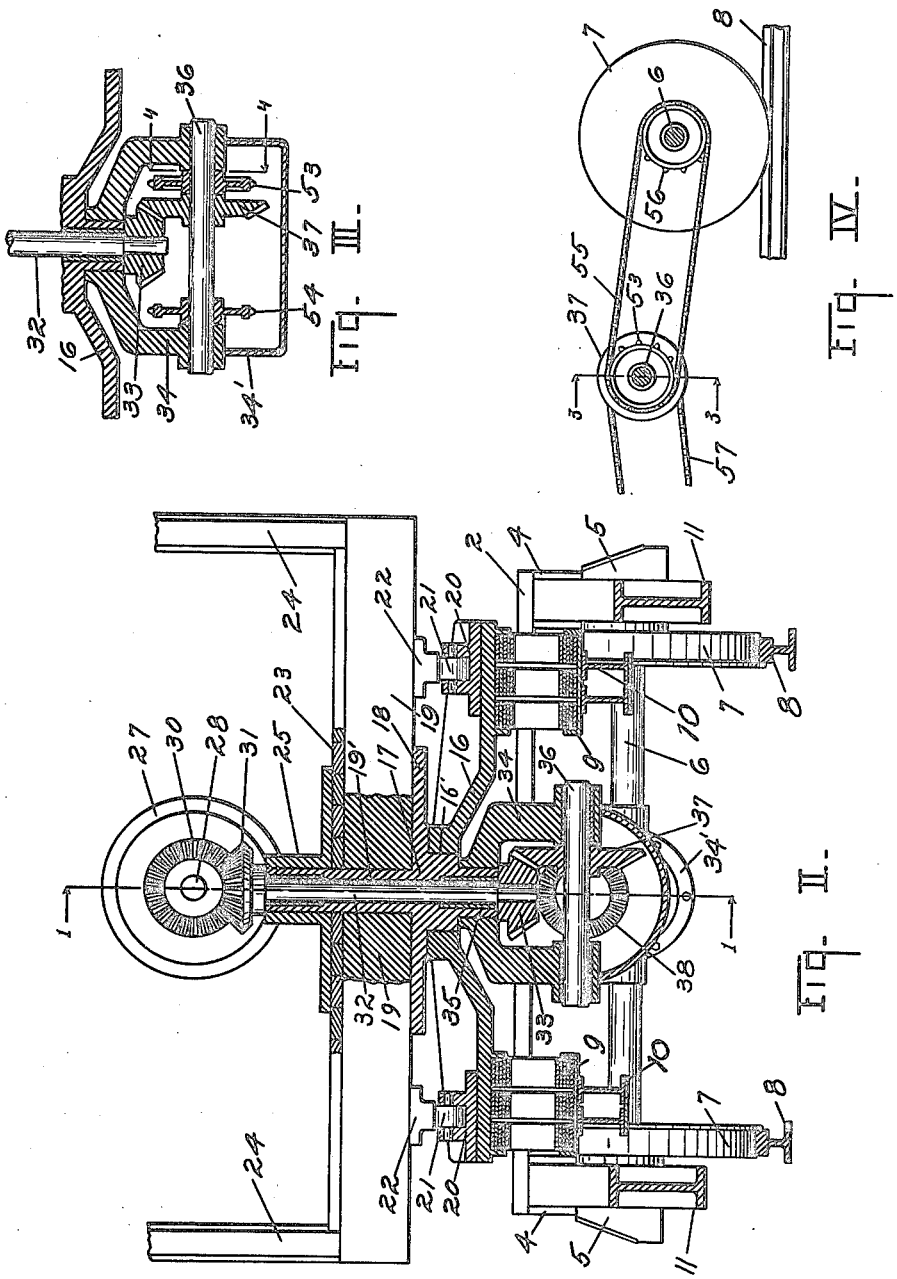

UNITED STATES PATENT OFFICE.

SAMUEL J. DUNKLEY, OF KALAMAZOO, MICHIGAN.

DRIVING MEANS FOR MOTOR-DRIVEN RAILWAY-CARS.

1,222,610. Specification of Letters Patent. Patented Apr. 17, 1917.

Application filed March 1, 1916. Serial No. 81,498.

*To all whom it may concern:*

Be it known that I, SAMUEL J. DUNKLEY, a citizen of the United States, residing at Kalamazoo, Michigan, have invented certain new and useful Improvements in Driving Means for Motor-Driven Railway-Cars, of which the following is a specification.

This invention relates to improvements in driving means for motor driven railway cars.

The objects of this invention are:

First, to provide suitable connections from an engine or other prime mover on the floor of the car to the wheels of the truck beneath.

Second, to provide such a connection in which there is ample compensation for the spring action between the platform of the car and the car axles.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail vertical section of a railway car truck and a portion of the car body, showing the embodiment of my invention, taken on line 1—1 of Fig. II.

Fig. II is a detail vertical section through a railway car and truck embodying the features of my invention, taken on line 2—2 of Fig. I.

Fig. III is a detail vertical section through a railway car truck, showing a modification wherein a chain drive is used for the same, taken on line 3—3 of Fig. IV.

Fig. IV is a detail vertical section showing the arrangement of the chains as disposed on a chain driven car truck, with the housing removed, taken on line 4—4 of Fig. III.

In the drawings, similar numerals of reference refer to similar parts throughout the several views, and the sectional views are taken looking in the direction of the little arrows at the ends of the section lines.

I have shown details of one truck and the end of the car supported thereby and the connections to a gasolene engine with a transmission which are shown diagrammatically.

Considering the numbered parts of the drawing, the truck comprises a frame consisting of cross pieces 1 and side pieces 3 of the usual construction, with pedestals 4 carrying the journal boxes 5 for the wheel axles 6 on which are mounted the car wheels 7, all running on the usual track 8. Cross tie pieces 2 are also provided. The springs 9 with their support 10 and equalizer bars 11 are of any usual or suitable design. The brake beam 12, brake shoe 13, brake lever 14 and brake rod 15 are of the usual construction. The truck bolster 16 has the car body bolster 19 pivotally mounted thereon by king bolt structure, the truck bolster 16 being provided with roller brackets 20 carrying the bearing rollers 21 which coact with the circular track or fifth wheel 22. The usual floor boards 23 are secured to the bolster 19 and the car has the usual side walls 24. These parts are all of usual construction for street car or railway car use, and my invention does not pertain to these details.

The king bolt 17 I provide with a flange 18 for securing it to the bolster 19 of the car. This king bolt is hollow and a part extends upward like a bushing 19' through and above the deck of the car, being provided with a roller bearing or other anti-friction means within its upper end. The lower end extends downwardly and fits into a suitable bearing 16' in the truck bolster 16, and is provided with a roller bearing 35 or other anti-friction means at its lower end. An upper center plate 25 surrounds the upwardly-projecting portion 19' of the king bolt, this center plate being secured to the floor of the car.

On the floor of the car is disposed the engine 26, here shown in conventional form, preferably a gasolene engine with a suitable transmission or clutch means 27, here shown in conventional form as a magnetic clutch means.

The driving shaft 28 extends from this transmission and is supported in suitable bearing blocks 29, 29 secured upon or formed integrally with the upper center plate 25. A beveled gear 30 is mounted on the driving or propeller shaft 28 and meshes with the gear 31 mounted on the upper end of the vertical shaft 32, which is centrally disposed in the king bolt. A beveled driving pinion 33 is on the lower end of the shaft 32, being within the truck gear housing 34. The truck gear housing 34 is also pivoted on the lower end of the king bolt structure. A shaft 36 is journaled in the lower part of the truck gear housing 34 and to it is secured the driven beveled gear 37 which meshes with the driving pinion 33. The driven gear 37 meshes with the beveled gears 38, 38 which are secured to forwardly and rearwardly extending shafts 39, which shafts are in suitable anti-friction journal bearings in the front and rear portion of the housing 34.

The shaft 39 with the shaft 40 constitutes the propeller shaft for driving the axles of the car. These parts 39 and 40 are connected by a universal joint 41 provided with a slip connection 41' to the shaft 40 to provide flexibility and compensate for the variation in the length due to the thrust when the car is loaded, or for any other reason depresses and compresses its supporting springs.

On the shaft 40 is mounted the pinion 42 which meshes with the driven gear 43 on the axle 6. A housing 46 is provided for the shaft 40 which, with its cover 47 secured in place by the bolts 48, serves as an oil chamber for these parts, and which, when connected with the universal joint casing 44, forms a complete oil chamber for these parts. Springs 52 are provided on the bolts 49 to afford a yielding connection, so that the housing as well as the other parts can compensate and take care of the varying motion between the parts.

In Figs. III and IV I show a modification of the driving connection from the shaft 36, consisting of sprocket wheels 53, 54 on the shaft 36, and sprocket wheels 56 on the axles 6. Sprocket chains 55 and 57 connect the sprocket wheels 53 and 54, respectively, to the axles. Where chains are made use of, the slack in the chains takes care of the slight play of the loaded car on the springs of the truck and no special compensating means is then required to take care of this movement.

From this description it will be seen that I have disposed a driving shaft centrally within the king bolt structure of a car and have connected thereto by beveled gear an engine disposed on the platform or floor of the car. Beneath the central part of the floor of the car and beneath the truck bolster I have disposed a suitable housing carrying the driven gear which, in turn, actuates preferably propeller shafts to drive the car axles.

From this general statement, I believe it will be clear that the structural details of my improved driving means for street cars can be greatly varied without departing from my invention. I desire, however, to claim the invention in the specific form in which I have illustrated it, and to also claim the same broadly as pointed out in the appended claims.

Having thus described my invention, what I claim as new and desire to secure by Letters Patent is:

1. In a motor driven railway car, the combination with the car body, truck, bolsters and king bolt connections of an engine carried on the floor of the car, a driving shaft, suitable transmission connections from the engine to said driving shaft, a vertical connecting shaft disposed and journaled centrally in the king bolt of the car, beveled gears connecting the driving shaft with said vertical shaft, a gear housing disposed below the truck bolster, propeller shafts journaled in the said housing, a train of gears between the said vertical shaft and the said propeller shafts, universal joints with slip connections in said propeller shafts, and beveled gear connections between the propeller shafts and the car axles, coacting for the purpose specified.

2. In a motor driven railway car, the combination with the car body, truck, bolsters and king bolt connections, of a vertical shaft centrally disposed and journaled within the king bolt structure, driving means for the upper end of the shaft, and flexible driving connections from the lower end of the shaft to the car axles, as specified.

3. In a motor driven railway car, the combination with the car body, truck, bolsters and king bolt connections, of a vertical shaft centrally disposed and journaled within the king bolt structure, driving means for the upper end of the shaft, a gear housing disposed below the truck bolster, propeller shafts journaled in the said housing, a train of gears between the said vertical shaft and the said propeller shafts, universal joints with slip connections in said propeller shafts, and beveled gear connections between the propeller shafts and the car axles, coacting for the purpose specified.

4. In a motor driven railway car, the combination with the car body, truck, bolsters and king bolt connections of an engine carried on the floor of the car, a driving shaft, suitable transmission connections from the engine to said driving shaft, a vertical connecting shaft disposed and journaled centrally in the king bolt of the car, beveled gears connecting the driving shaft with said vertical shaft, and flexible driving connections from the lower end of the shaft to the car axles, as specified.

5. In a motor driven railway car, a vertical shaft with driving means at its upper end centrally disposed in the truck of said car, a gear housing surrounding the lower end thereof, propeller shafts with universal joints and slip connections, one end of each journaled in the said housing, a train of gears connecting the same to the vertical shaft, and beveled gearings connecting the said propeller shafts to the car axles, as specified.

6. In a motor driven railway car, the combination of the car body, truck, bolsters and king bolt connections, of a vertical shaft centrally disposed and journaled in said king bolt, means for driving the same, a beveled pinion at the lower end thereof, a driven gear meshing therewith, a propeller shaft with universal joint having a slip connection with gear connected to be driven by the said driven gear, and beveled gearing connecting the said propeller shaft to the car axle, as specified.

7. In a motor driven railway car, the combination of a gear housing beneath the bolster of the truck, a driving gear supported thereby, a propeller shaft with gear connection to the said driving gear and with gear connection to a car axle, a universal joint in said shaft with slip connection, and a housing surrounding the same with a yielding transverse joint therein, coacting as specified.

In witness whereof, I have hereunto set my hand and seal in the presence of two witnesses.

SAMUEL J. DUNKLEY. [L. S.]

Witnesses:
 LUELLA G. GREENFIELD,
 M. PHINA WOODRUFF.